US011396814B2

(12) United States Patent
Barker

(10) Patent No.: US 11,396,814 B2

(45) Date of Patent: Jul. 26, 2022

(54) MULTI-PIECE MANDREL FOR CMC COMPONENTS

(71) Applicant: Raytheon Technologies Corporation, Farmington, CT (US)

(72) Inventor: William M. Barker, Biddeford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 42 days.

(21) Appl. No.: 16/891,324

(22) Filed: Jun. 3, 2020

(65) Prior Publication Data

US 2021/0381384 A1 Dec. 9, 2021

(51) Int. Cl.
*F01D 5/14* (2006.01)
*B29C 70/32* (2006.01)

(52) U.S. Cl.
CPC .............. *F01D 5/147* (2013.01); *B29C 70/32* (2013.01)

(58) Field of Classification Search
CPC .......... F01D 5/147; B29C 70/32; B29C 33/48
See application file for complete search history.

(56) References Cited

U.S. PATENT DOCUMENTS

| | | | |
|---|---|---|---|
| 1,676,325 A * | 7/1928 | Doll | B29C 33/485 425/393 |
| 4,541,605 A | 9/1985 | Kubota et al. | |
| 5,264,162 A * | 11/1993 | Salem | C04B 38/0022 264/103 |
| 2002/0084029 A1* | 7/2002 | Turner | B29C 45/14491 156/307.7 |
| 2010/0025529 A1* | 2/2010 | Perry | B29C 65/562 244/117 R |
| 2010/0304097 A1 | 12/2010 | Nokleby et al. | |
| 2017/0100859 A1 | 4/2017 | Register | |
| 2018/0236694 A1 | 8/2018 | Eisch et al. | |
| 2020/0094447 A1* | 3/2020 | Blaney | B29C 53/824 |

OTHER PUBLICATIONS

European Search Report for European Patent Application No. 21177352.8 completed Oct. 14, 2014 (dated Jan. 26, 2022).

* cited by examiner

*Primary Examiner* — Matthew J Daniels
*Assistant Examiner* — Gregory C. Grosso
(74) *Attorney, Agent, or Firm* — Carlson, Gaskey & Old, P.C.

(57) ABSTRACT

A mandrel for a molding process. The mandrel includes a first portion that has a first draft surface and a second draft surface. A second portion and a third portion are included. The second portion has a third draft surface and the third portion has a fourth draft surface wherein the first draft surface engages the third draft surface and the second draft surface engages the fourth draft surface. A channel extends along a length of the mandrel at an interface between the first, second, and third portions such that the second portion does not contact the third portion.

19 Claims, 7 Drawing Sheets

130 132 142 $H_2$ 136 134 $H_1$ 144 140 L 168 150 138 $H_4$ 156 148 152 154 164 $H_3$ 166 160 151 158 162

MULTI-PIECE MANDREL FOR CMC COMPONENTS

BACKGROUND

This application relates to a mandrel having a constant cross-section for forming components from ceramic matrix composites.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

Some known methods of forming blade outer air seals of ceramic matrix composite fiber layers use a mandrel.

SUMMARY

In one exemplary embodiment, a mandrel for a molding process. The mandrel includes a first portion that has a first draft surface and a second draft surface. A second portion and a third portion are included. The second portion has a third draft surface and the third portion has a fourth draft surface wherein the first draft surface engages the third draft surface and the second draft surface engages the fourth draft surface. A channel extends along a length of the mandrel at an interface between the first, second, and third portions such that the second portion does not contact the third portion.

In a further embodiment of any of the above, the first and second draft surfaces provide a taper along a length of the first portion.

In a further embodiment of any of the above, the third draft surface provides an opposing taper along a length of the second portion.

In a further embodiment of any of the above, the mandrel has a constant cross-section along a length of the mandrel.

In a further embodiment of any of the above, the first portion has a generally rhombus cross-section. The second and third portions each have a generally triangular cross-section and the mandrel forms a substantially triangular cross-section.

In a further embodiment of any of the above, a plurality of channels extend along a length of the mandrel.

In a further embodiment of any of the above, at least three channels are arranged on the mandrel.

In a further embodiment of any of the above, one of the channels is near each corner of the triangular cross-section.

In a further embodiment of any of the above, a hole is arranged in the first portion and extends along a length of the first portion In a further embodiment of any of the above, the first, second, and third portions are formed from graphite.

In another exemplary embodiment, a mandrel assembly includes a mandrel formed from a first portion that has first and second draft surfaces. A second portion has a third draft surface. A third portion has a fourth draft surface. The first draft surface engages the third draft surface and the second draft surface engages the fourth draft surface. A first end piece and a second end piece are arranged at opposite ends of the mandrel and are configured to secure the first, second, and third portions together.

In a further embodiment of any of the above, the first portion has a first draft surface and a second draft surface. The second portion has a third draft surface and the third portion has a fourth draft surface. The first draft surface engages the third draft surface and the second draft surface engages the fourth draft surface.

In a further embodiment of any of the above, a pin extends from the first end piece through a hole in the mandrel to the second end piece.

In a further embodiment of any of the above, the mandrel is formed from graphite.

In a further embodiment of any of the above, the first and second end pieces are formed from aluminium.

In another exemplary embodiment, a method of forming a matrix composite component, includes providing a mandrel formed from a first portion, a second portion, and a third portion. The mandrel has a channel that extends along a length of the mandrel at an interface between the first, second, and third portions, such that the second portion does not contact the third portion. A matrix composite laminate is wrapped about the mandrel to form a preform. The first portion is removed from the preform. The second and third portions are removed from the preform after the first portion has been removed.

In a further embodiment of any of the above, the preform is densified before removing the mandrel.

In a further embodiment of any of the above, the mandrel has a plurality of channels and the preform is densified via chemical vapor infiltration.

In a further embodiment of any of the above, the mandrel is mounted within a tooling assembly. The tooling assembly comprising a bottom piece and a top piece that form an outer mold surface for a component.

In a further embodiment of any of the above, the preform is machined after removing the mandrel to form a plurality of components.

DETAILED DESCRIPTION

Figure 1:
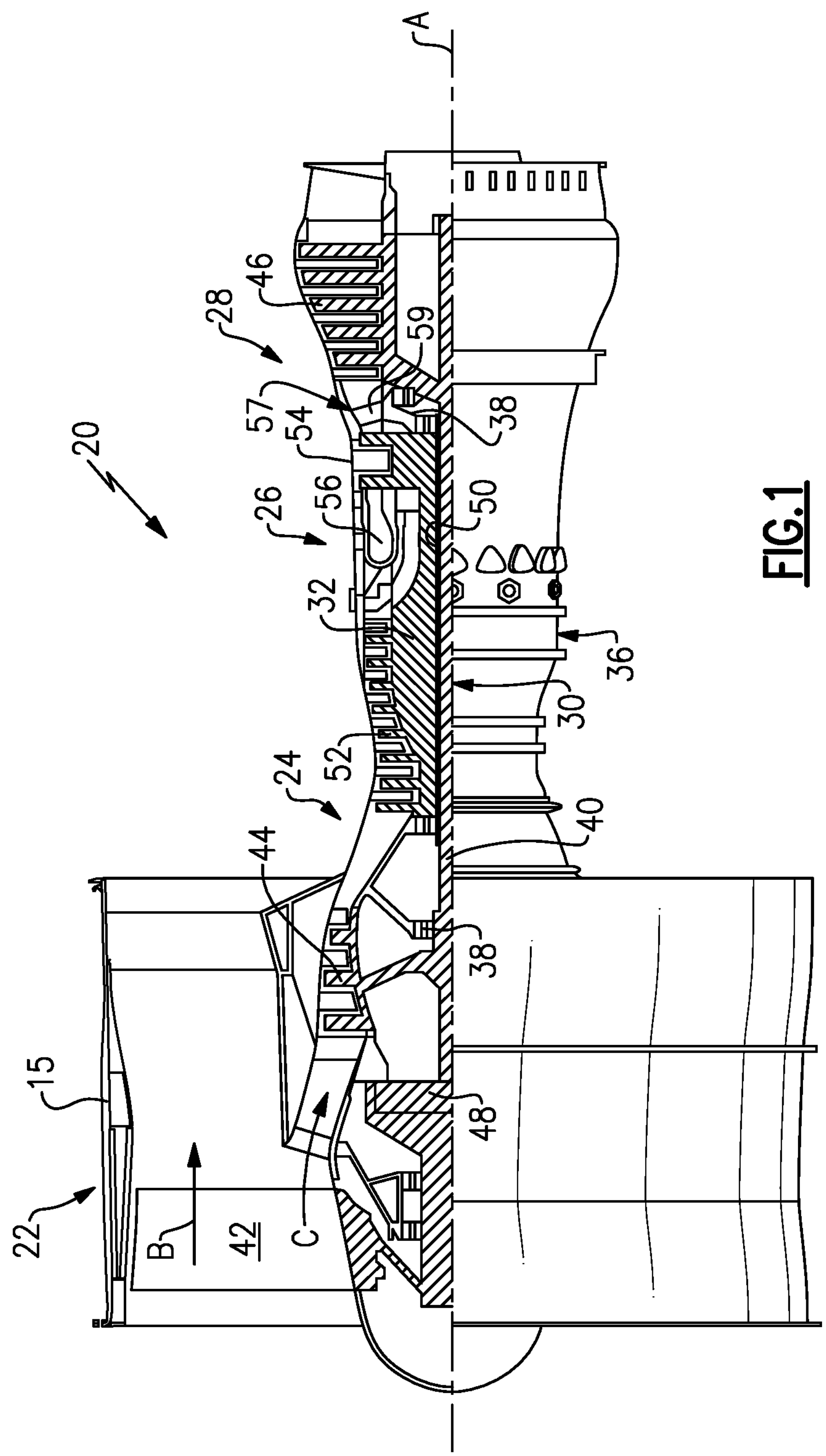
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{R})/(518.7^\circ \text{R})]^{0.5}$. The "Low corrected fan tip speed" as disclosed herein according to one non-limiting embodiment is less than about 1150 ft/second (350.5 meters/second).

Figure 2:
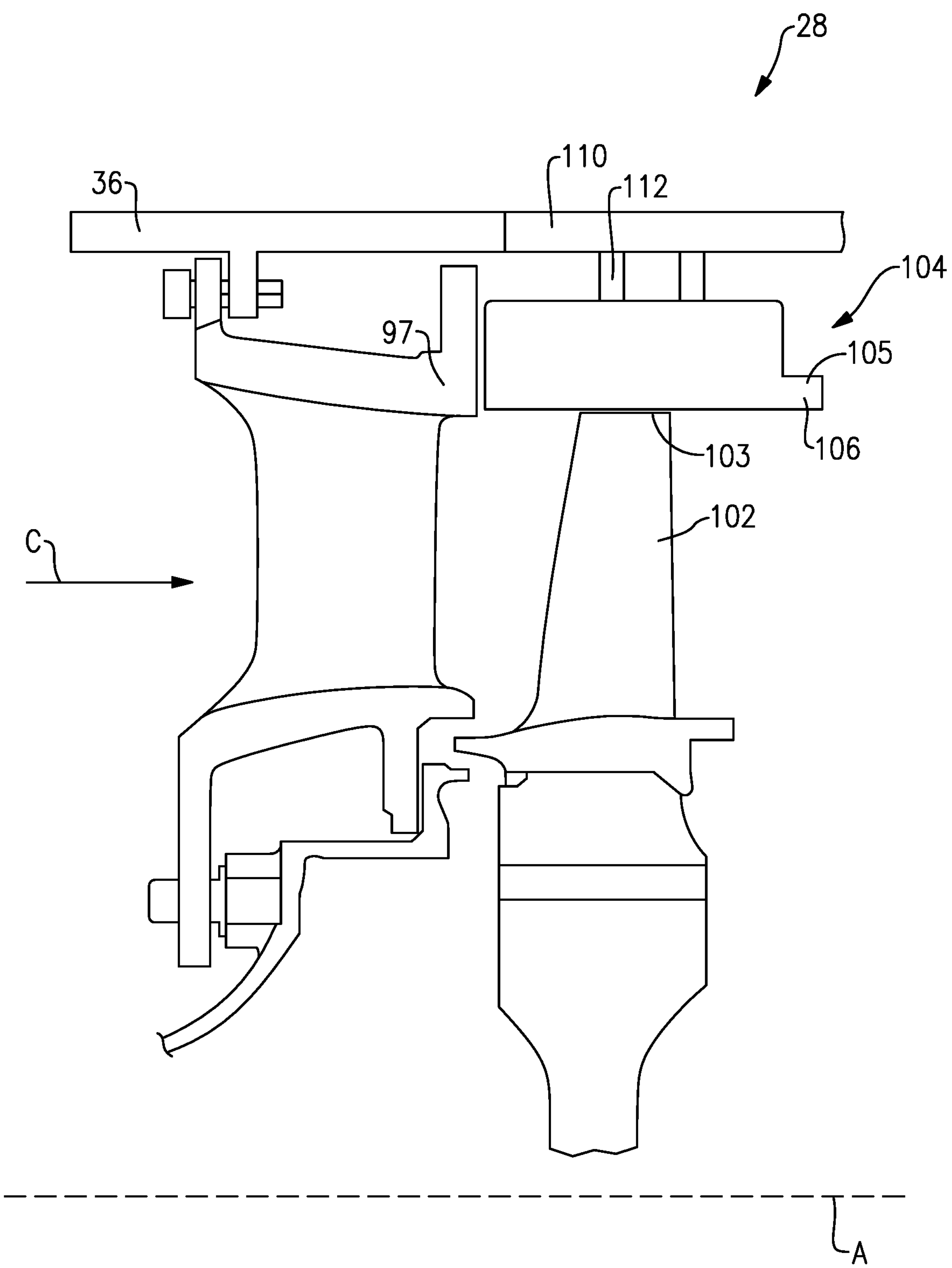
FIG. 2 shows a turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a ceramic material, such as a ceramic matrix composite ("CMC").

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
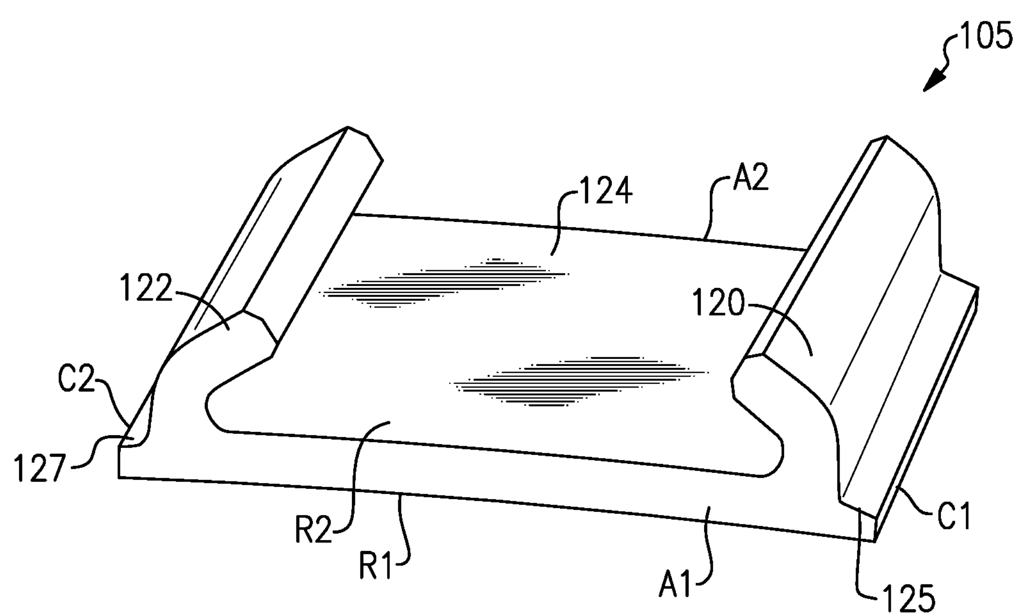
FIG. 3 shows an exemplary blade outer air seal.

FIG. 3 illustrates an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 circumferentially spaced from a second wall 122. The first and second walls 120, 122 extend generally radially outward from a base portion 124. The first and second walls 120, 122 extend along an axial length of the seal segment 105. The first and second walls 120, 122 may be angled toward one another, in one example. The first and second walls 120, 122 are arranged near the first and second circumferential sides C1, C2, respectively. The base portion 124 extends between the first and second axial sides A1, A2 and defines a gas path on a radially inner side and a non-gas path on a radially outer side. The base portion 124 extends circumferentially beyond the first and second walls 120, 122 to form seal surfaces 125, 127, respectively. The sealing surfaces 125, 127 may taper radially inward, for example. In this disclosure, forward, aft, upstream, downstream, axial, radial, or circumferential is in relation to the engine axis A unless stated otherwise. The base portion 124 may extend axially forward and/or aft of the first and second walls 120, 122 to provide a surface for sealing of the BOAS first and second axial sides A1, A2.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets, in tooling, injecting a liquid resin into the tooling, and curing to form a solid composite component. The component may be densified by adding additional material to further stiffen the laminates. In some more complex components, preformed parts are further provided within the tooling before material is put into the tooling. For example, a mandrel may be used to occupy a cavity in the component to prevent material from flowing into the cavity.

Figure 4A:
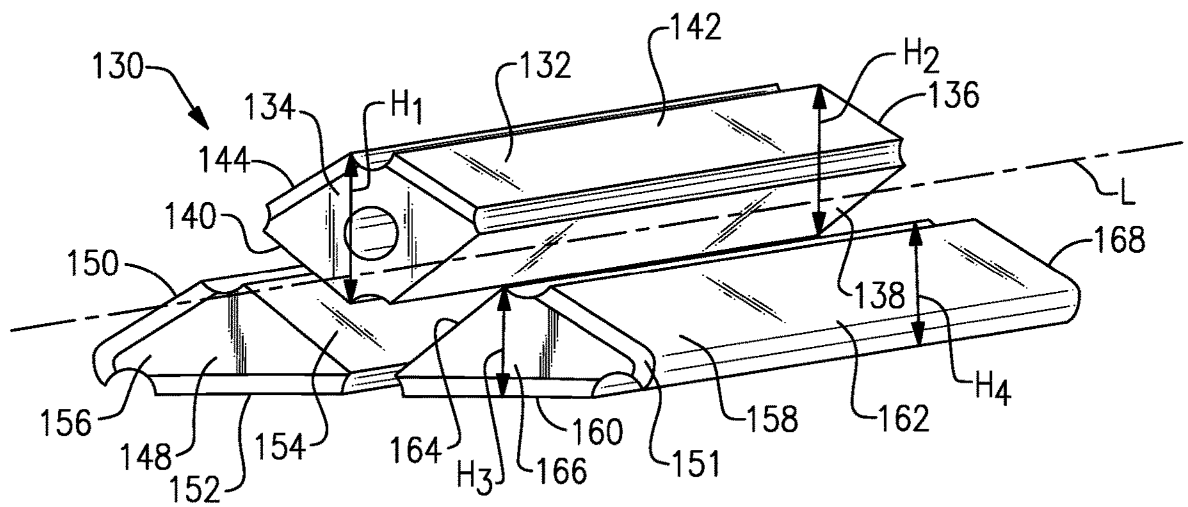
FIG. 4A shows an exploded view of an exemplary mandrel.
Figure 4B:
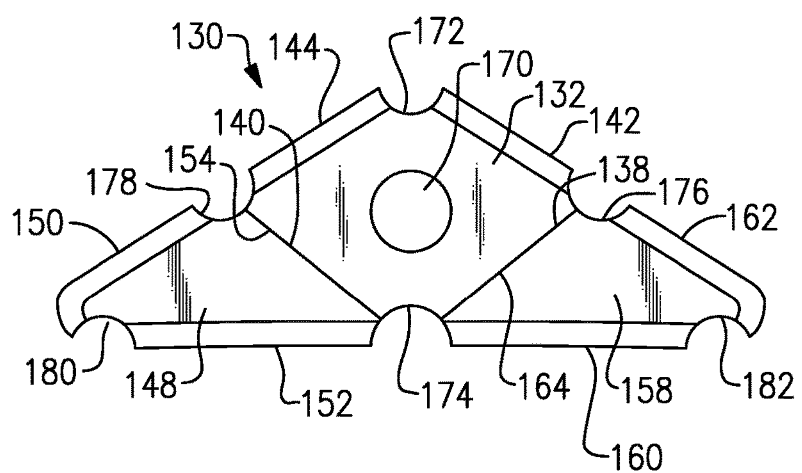
FIG. 4B shows a front view of the exemplary mandrel.

FIGS. 4A-4B illustrate a multi-piece mandrel 130 according to an embodiment. FIG. 4A shows an exploded view of the multi-piece mandrel 130. The mandrel 130 includes a first or top portion 132, a second portion 148, and a third portion 158. The first portion 132, second portion 148, and third portion 158 are all separate pieces. Each of the first, second, and third portions 132, 148, 158 extend longitudinally along an axis L. The first portion 132 has a generally rhombus shaped cross-section. The second and third portions 148, 158 each have a generally triangular shaped cross-section. In some examples, a fillet 151 extends along edges of the first, second, and third portions 132, 148, 158

The first portion 132 has a first draft surface 138, a second draft surface 140, a first outer surface 142, and a second outer surface 144. Each of the surfaces 138, 140, 142, 144 extend between a first end 134 and a second end 136. The first and second draft surfaces 138, 140 are configured to engage with surfaces of the third and second portions 158, 148, respectively. The first and second draft surfaces 138, 140 provide a taper along the length of the first portion 132. That is, the first and second draft surfaces 138, 140 are angled with respect to the first and second outer surfaces 142, 144 and the axis L. In other words, the first portion 132 has a first height $H_1$ at the first end 134 and a second height $H_2$ at the second end 136 that is smaller than the first height $H_1$.

The second portion has a draft surface 154, a first outer surface 150, and a second outer surface 152. The third portion 158 has a draft surface 164, a first outer surface 160, and a second outer surface 162. Each of the surfaces 154, 150, 152, 164, 160, 162 extend between a first end 166 and a second end 168. The draft surfaces 154, 164 are configured to engage with the second and first draft surfaces 138, 140, respectively. The draft surfaces 154, 164 provide a taper along the length of the second and third portions 148, 158, respectively. That is, the draft surfaces 154, 164 are angled with respect to the outer surfaces 150, 152, 160, 162 and the axis L. In other words, a third height $H_3$ at the first end 166 is smaller than a fourth height $H_4$ at the second end 168. The draft surfaces 154, 164 have the opposite angle as the first and second draft surfaces 138, 140 of the first portion 132, such that the first, second, and third portions 132, 148, 158 together have a constant cross-section along the length of the mandrel 130. That is, a difference between the first and second heights $H_1$, $H_2$ is about the same as a difference between the third and fourth heights $H_3$, $H_4$. In one example, the draft surfaces 138, 140, 154, 164 have a draft angle that may be approximated as an angle between the surface and the axis L of between 1 and 10°. In one embodiment, a difference between the first height $H_1$ and the second height $H_2$ is between about 0.005 inches (0.127 mm) and 0.100 inches (2.54 mm). The particular draft angle may depend on the length of the mandrel 130, for example.

Referring to FIG. 4B, and with continued reference to FIG. 4A, the first, second, and third portions 132, 148, 158 together form a generally triangular shape. The first draft surface 138 of the first portion 132 abuts the draft surface 164 of the third portion 158, and the second draft surface 140 of the first portion 132 abuts the draft surface 154 of the second portion 148. The outer surfaces 142, 144, 150, 152, 160, 162 provide the shape of the mandrel 130 for forming a component, and may be shaped depending on the component they are used to form.

A hole 170 extends through the first portion 132. The hole 170 may extend along the entire length of the first portion 132. The hole 170 extends generally parallel to the axis L. The hole 170 may be used along with a bolt or pin to secure the mandrel 130 to a fixture or other tooling. The hole 170 may be circular, for example. Although a round hole 170 is shown, other shaped holes may be used. A plurality of channels 172, 174, 176, 178, 180, 182 extend along the mandrel 130. The channels 172, 174, 176, 178, 180, 182 may run along an entire length of the mandrel 130, for example. The channels 172, 174, 176, 178, 180, 182 may be substantially parallel to the axis L. The channels 172, 180, 182 are generally arranged at each corner of the triangular shaped mandrel 130. Channels 174, 178 are formed at corners of the second portion 148 and the first portion 132 where the second draft surface 140 abuts the draft surface 154. Channels 174, 176 are formed at corners of the third portion 158 and the first portion 132 where the first draft surface 138 abuts the draft surface 164. The channel 174 forms a gap between the second and third portions 148, 158, such that the second and third portions 148, 158 do not contact one another.

The mandrel 130 may be used to form a component from a CMC material, or may be used to form other matrix composite components, such as organic matrix composite ("OMC"), polymer matrix composite ("PMC"), or metal matrix composite ("MMC") components. The mandrel may be formed from graphite for use in high temperature furnaces, in one example. In use, the CMC component is formed around the mandrel 130, then the first, second, and third portions 132, 148, 158 are slid out of the component one at a time. The opposing draft surfaces 138, 164 between the first and third portions 132, 158 and the opposing draft surfaces 140, 154 between the first and second portions 132, 148 allow for a mandrel that is easier to remove, because it avoids being locked into the component. The channels 172, 174, 176, 178, 180, 182 may help prevent die lock and permit densification of the component while the component is still on the mandrel 130. In particular, the channel 174 prevents die lock of the second and third portions 148, 158 by providing a gap between the second and third portions 148, 158.

Figure 5:
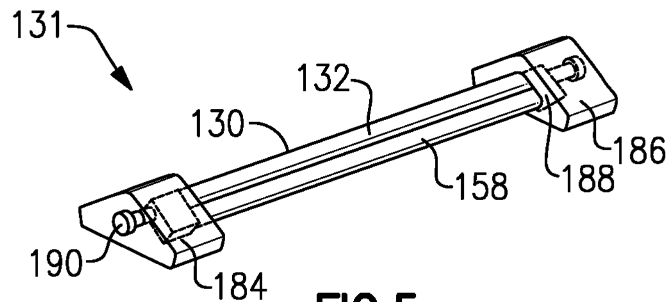
FIG. 5 shows an exemplary mandrel assembly.

FIG. 5 shows an exemplary mandrel assembly for forming a component. The first, second, and third portions 132, 148, 158 of the mandrel 130 are assembled together. A first end piece 184 and a second end piece 186 fit over opposing ends of the mandrel 130 to form a mandrel assembly 131. Each of the end pieces 184, 186 has a recess 188 for receiving an end of the mandrel 130. The end pieces 184, 186 maintain the first, second, and third portions 132, 148, 158 in place relative to one another during use. In some examples, a bolt or pin 190 extends through the end pieces 184, 186 and the mandrel 130. The pin 190 extends through the hole 170 in the first portion 132. The pin 190 and the first and second end pieces 184, 186 constrain the portions 132, 148, 158 of the mandrel 130. The end pieces 184, 186 prevent the portions 132, 148, 158 from moving with respect to one another, particularly along the draft surfaces 138, 140, 154, 164. With the first, second, and third portions 132, 148, 158 held together, the mandrel assembly 131 can be used to form a CMC component. The end pieces 184, 186 may be aluminum, for example.

Figure 6:
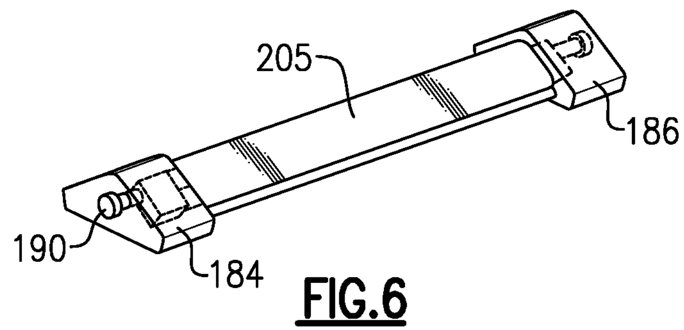
FIG. 6 shows a method step of using an exemplary mandrel assembly.
Figure 7:
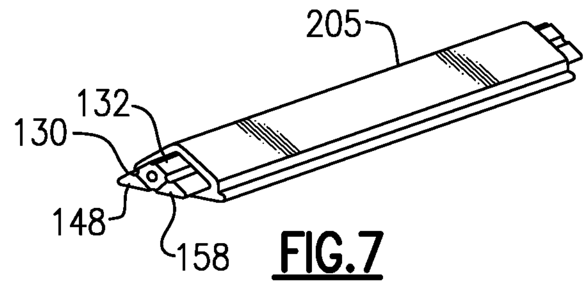
FIG. 7 shows a method step of using an exemplary mandrel assembly.

FIG. 6 shows a method step of forming a component. A plurality of CMC laminate layers are wrapped about the mandrel 130 to form a preform 205. The CMC laminate layers may be silicon carbide fibers, formed into a woven fabric in each layer, for example. FIG. 7 shows another method step of forming a component. After the preform 205 is formed about the mandrel 130, the end pieces 184, 186 are removed from the assembly 131 prior to removing the mandrel 130 from the preform 205.

Figure 8:
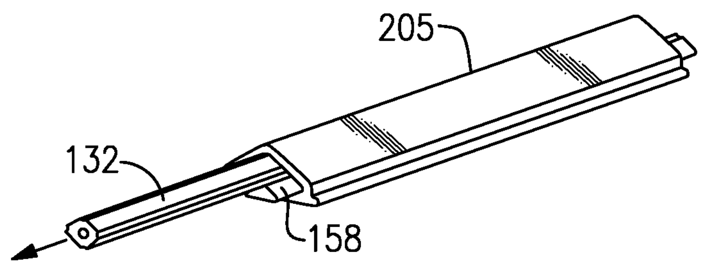
FIG. 8 shows a method step of using an exemplary mandrel assembly.

After the preform 205 is formed, the mandrel 130 is removed from the preform 205, as shown in FIG. 8. The mandrel 130 is removed by removing the top portion 132 first. The top portion 132 is slid out in a direction parallel to the longitudinal direction L. The draft surfaces 138, 140 permit the top portion 132 to slide out in this direction. After the top portion 132 is removed, the second and third portions 148, 158 may be removed. The channel 174 (shown in FIG. 4B) provides space between the second and third portion 148, 158 for them to move towards one another, providing clearance for these portions 148, 158 to be removed. Once the mandrel 130 is removed, the preform 205 may be further machined to form a final component or multiple components. In some examples, the preform 205 is densified before the removing step of FIG. 8. The preform 205 may be densified using additional tooling, as explained further below.

Figure 9A:
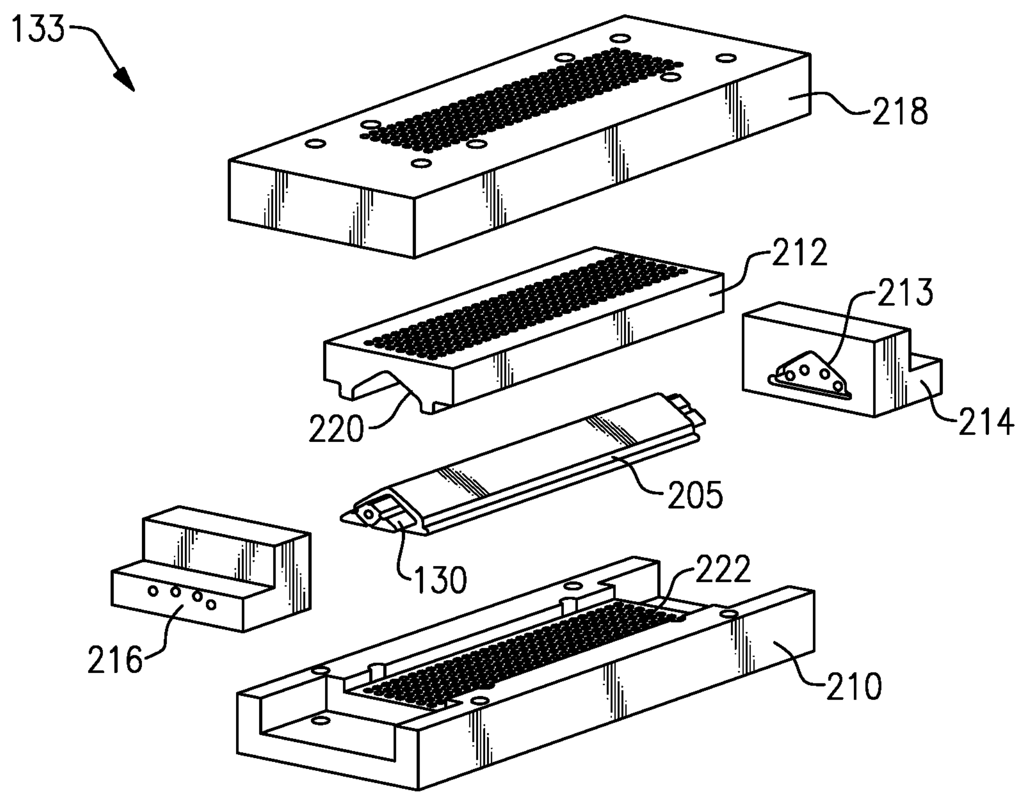
FIG. 9A shows an exploded view of exemplary tooling for manufacturing a component.
Figure 9B:
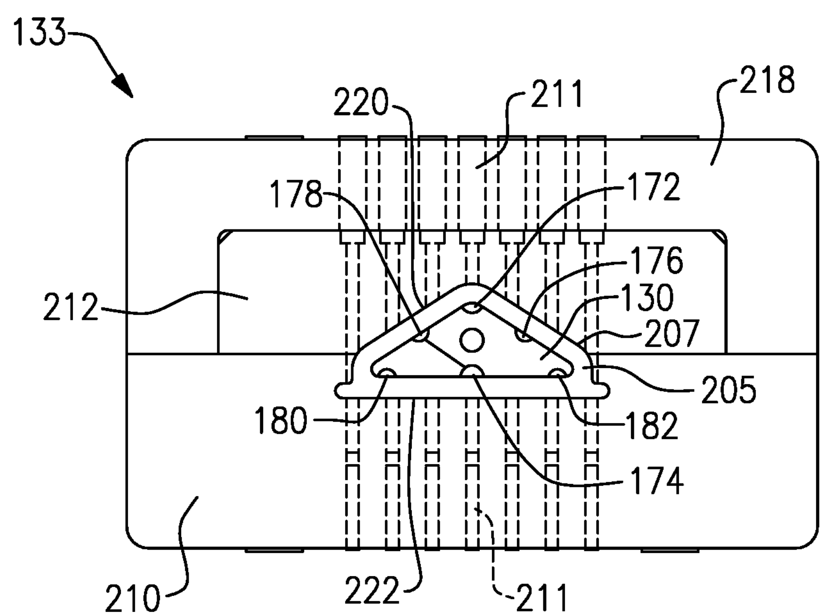
FIG. 9B shows a front view of the exemplary tooling.

FIGS. 9A-9B show example tooling 133 for forming a component. The tooling 133 may be used to densify the component formed via the method explained above. In some examples, the component is densified before the mandrel 130 is removed. The tooling 133 generally includes a first side 214 and a second side 216 that receive the mandrel 130. In one example, the first and second sides 214, 216 each have a recess 213 for receiving ends of the mandrel 130. A bottom portion 210 receives the first and second sides 214, 216, and is arranged beneath the mandrel 130. A top portion 212 is arranged above the mandrel 130. A cap 218 holds the top portion 212 and first and second sides 214, 216 in place. In one example, the bottom portion 210, top portion 212, cap 218, first side 214, and second side 216 are formed from graphite. Although the example tooling 133 uses five primary tool pieces along with the mandrel 130, more or fewer tooling pieces may be used within the scope of this disclosure. In some examples, a bolt or pin may extend into the cap 218 and bottom portion 210 to secure the tooling pieces together. The tooling 133 provides a densification chamber about the mandrel 130 to form the CMC plies of the component into the desired shape. In some embodiments, the bottom portion 210 and top portion 212 have surfaces 220, 222, respectively, that form a densification chamber 207 and provide the outer mold surface for the component.

Referring to FIG. 9B, with continued reference to FIG. 9A, the preform 205 may be densified within the tooling 133. The first and second sides 214, 216, the bottom and top portions 210, 212, and the top cap 218 have passages 211 to permit material to flow to the preform 205 within the densification chamber 207. Densification generally includes adding additional material to make the CMC laminates stiffer than their free woven or braided fiber state. The densification process increases the density of the laminate material after assembly. A filler material, such as a silicon carbide matrix material, is injected into the spaces between the fibers in the woven layers. The preform 205 may be densified via chemical vapor infiltration (CVI), for example.

After the preform 205 is formed and solidified, the mandrel 130 and preform 205 are removed from the tooling 133, and the mandrel 130 is removed from the preform 205. The preform 205 may then be machined to a final shape to form a component. The component may be a BOAS component, such as the BOAS seal segment 105 as shown in FIG. 3. The preform 205 may be machined to form multiple seal segments 105, in some examples. In one example, the preform 205 is machined to form three seal segments 105, though more or fewer seal segments 105 may be formed from a single preform 205. Forming multiple seal segments 105 from a single preform 205 may allow for more efficient manufacturing, as fewer mandrels 130 and tooling assemblies 133 are needed.

Figure 10A:
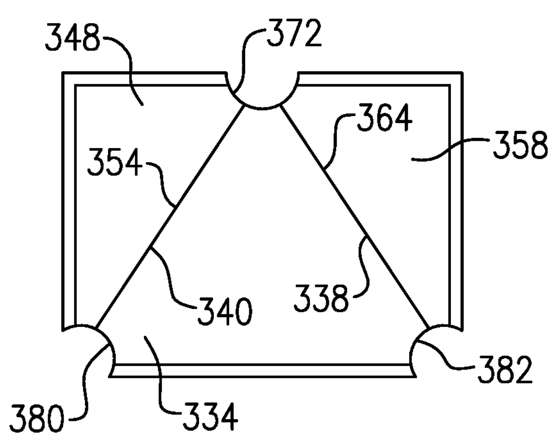
FIG. 10A shows a front view of another exemplary mandrel.

In some examples, the mandrel may have other cross-sections. FIGS. 10A-10D show additional multi-piece mandrels with internal draft surfaces. The mandrel of FIG. 10A is rectangular, and is made up of three triangular portions 334, 348, 358. The first and second portions 334, 348 have opposing draft surfaces 340, 354, respectively. The first and third portions 334, 358 have opposing draft surfaces 338, 364, respectively. A plurality of channels 372, 382, 380 are arranged along an outer surface of the mandrel at the draft surface interfaces. In particular, the channel 372 is formed where the three portions 334, 348, 358 meet, such that the second portion 348 and the third portion 358 do not contact one another. The channel 372 prevents die lock of the triangular second and third portions 348, 358 by permitting the second and third portions 348, 358 to move inward towards one another after the first portion 334 has been removed.

Figure 10B:
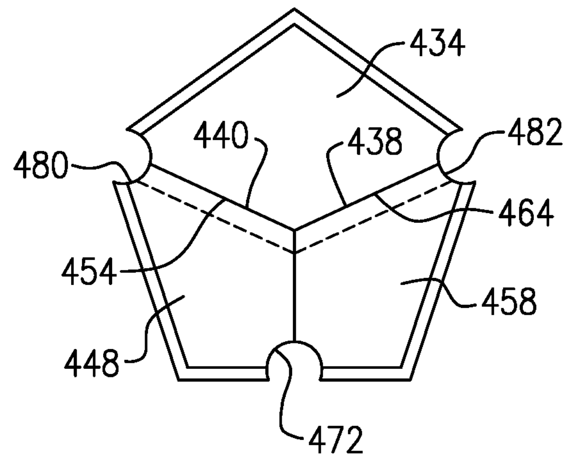
FIG. 10B shows a front view of another exemplary mandrel.

FIG. 10B shows an example mandrel having a pentagonal cross-section. The first and second portions 434, 448 have opposing draft surfaces 440, 454, respectively. The first and third portions 434, 458 have opposing draft surfaces 438, 464, respectively. A plurality of channels 472, 482, 480 are arranged along an outer surface of the mandrel at the draft surface interfaces. The channels 480, 482 prevent die lock of the second and third portions 448, 458 by permitting these portions to move upward after the first portion 434 has been removed.

Figure 10C:
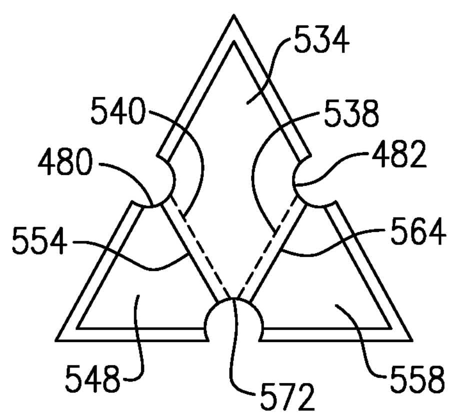
FIG. 10C shows a front view of another exemplary mandrel.

FIG. 10C shows another example triangular mandrel. In this example the first, second, and third portions 534, 548, 558 form an equilateral triangle.

Figure 10D:
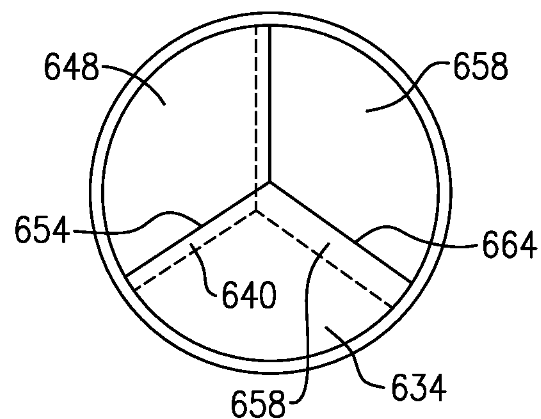
FIG. 10D shows a front view of another exemplary mandrel.

FIG. 10D shows an example round mandrel. The first and second portions 634, 648 have opposing draft surfaces 640, 654, respectively. The first and third portions 634, 658 have opposing draft surfaces 638, 664, respectively. In this example, the first portion 634 is removed in a first direction, and the second and third portions 648, 658 are removed in a second direction opposite the first direction to prevent die lock. Although the example mandrels are shown with three portions, a mandrel having additional portions may fall within the scope of this disclosure.

Forming CMC components with an internal mandrel may be challenging, as proper draft angles are needed to remove the mandrel after densification. Some known mandrels require the component to have a taper to allow the mandrel to be pulled from the part once the curing process is complete to prevent die lock. However, such tapers may make the components more complicated. For example, hook attachment faces on a BOAS segment having a draft may reduce the ability to control the hook contact surface. The disclosed multi-piece mandrel allows for a constant fully enclosed cross-section with no taper to be produced in a matrix composite plied component. The draft surfaces are on interfaces between mandrel pieces and do not contact the component. These draft surfaces prevent die lock and permit the multi-piece mandrel to be removed from the component after densification. The constant cross-section may further provide a stronger, more continuous ply construction and reduce the chance of having wrinkles or voids in the plies. The cross-section may also reduce any non-laminated zones, noodles, matrix, or chopped strands. The mandrel may further provide a more uniform hot wall thickness in thermal parts, such as a BOAS. The channels along the mandrel permit densification via CVI while the component is on the mandrel. Directly forming the CMC component around the graphite mandrel may also eliminate the need to swap mandrels during manufacturing, which may provide better dimensional control. Although a triangular cross-section mandrel is illustrated, the cross-section could be another shape.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A mandrel for a molding process, the mandrel comprising:

a first portion having a first draft surface and a second draft surface;

a second portion and a third portion, the second portion having a third draft surface and the third portion having a fourth draft surface wherein the first draft surface engages the third draft surface and the second draft surface engages the fourth draft surface;

a channel extends along a length of the mandrel at an interface between the first, second, and third portions such that the second portion does not contact the third portion; and wherein the first portion has a generally rhombus cross-section, the second and third portions each have a generally triangular cross-section, and the mandrel forms a substantially triangular cross-section.

2. The mandrel of claim 1, wherein the first and second draft surfaces provide a taper along a length of the first portion.

3. The mandrel of claim 2, wherein the third draft surface provides an opposing taper along a length of the second portion.

4. The mandrel of claim 1, wherein the mandrel has a constant cross-section along a length of the mandrel.

5. The mandrel of claim 1, wherein a plurality of channels extend along a length of the mandrel.

6. The mandrel of claim 5, wherein one of the channels is near each corner of the triangular cross-section.

7. The mandrel of claim 1, wherein a hole is arranged in the first portion and extends along a length of the first portion.

8. The mandrel of claim 1, wherein the first, second, and third portions are formed from graphite.

9. A mandrel for a molding process, the mandrel comprising:

a first portion having a first draft surface and a second draft surface;

a second portion and a third portion, the second portion having a third draft surface and the third portion having a fourth draft surface wherein the first draft surface engages the third draft surface and the second draft surface engages the fourth draft surface; a channel extends along a length of the mandrel at an interface between the first, second, and third portions such that the second portion does not contact the third portion; and wherein at least three channels extend along the length of the mandrel.

10. The mandrel of claim 9, wherein the first portion has a generally rhombus cross-section, the second and third portions each have a generally triangular cross-section, and the mandrel forms a substantially triangular cross-section.

11. A mandrel assembly, comprising:

a mandrel, the mandrel formed from a first portion having first and second draft surfaces, a second portion having a third draft surface, and a third portion having a fourth draft surface, wherein the first draft surface engages the third draft surface and the second draft surface engages the fourth draft surface;

a first end piece and a second end piece arranged at opposite ends of the mandrel and configured to secure the first, second, and third portions together; and wherein the first portion has a generally rhombus cross-section, the second and third portions each have a generally triangular cross-section, and the mandrel forms a substantially triangular cross-section.

12. The mandrel assembly of claim 11, wherein a pin extends from the first end piece through a hole in the mandrel to the second end piece.

13. The mandrel assembly of claim 11, wherein the mandrel is formed from graphite.

14. The mandrel assembly of claim 13, wherein the first and second end pieces are formed from aluminium.

15. The mandrel assembly of claim 11, wherein a plurality of channels extend along a length of the mandrel, and the each of the channels is formed along adjacent corners of two or more of the respective first, second and third portions.

16. A method of forming a matrix composite component, comprising:

providing a mandrel formed from a first portion, a second portion, and a third portion, the mandrel having a channel that extends along a length of the mandrel at an interface between the first, second, and third portions such that the second portion does not contact the third portion, wherein the first portion has a generally rhombus cross-section, the second and third portions each have a generally triangular cross-section, and the mandrel forms a substantially triangular cross-section; wrapping a matrix composite laminate about the mandrel to form a preform;

densifying the preform;

removing the first portion from the preform; and removing the second and third portions from the preform after the first portion has been removed.

17. The method of claim 16, wherein the mandrel has a plurality of channels and the preform is densified via chemical vapor infiltration.

18. The method of claim 16, wherein the mandrel is mounted within a tooling assembly, the tooling assembly comprising a bottom piece and a top piece that form an outer mold surface for a component.

19. The method of claim 16, wherein the preform is machined after removing the mandrel to form a plurality of components.

* * * * *